(12) United States Patent
Liu et al.

(10) Patent No.: US 10,973,233 B2
(45) Date of Patent: Apr. 13, 2021

(54) COATED FOOD PRODUCT AND METHOD OF PRODUCING THE COATED FOOD PRODUCT

(71) Applicant: General Mills, Inc., Minneapolis, MN (US)

(72) Inventors: Xia Liu, Maple Grove, MN (US); Carol Uy, New Brighton, MN (US); Daniel R Green, Minnetonka, MN (US); Douglas J Novak, Big Lake, MN (US); Gregory L Godsey, Cedar Rapids, IA (US)

(73) Assignee: General Mills, Inc., Minneapolis, MN (US)

( * ) Notice: Subject to any disclaimer, the term of this patent is extended or adjusted under 35 U.S.C. 154(b) by 155 days.

(21) Appl. No.: 16/061,961

(22) PCT Filed: Oct. 5, 2017

(86) PCT No.: PCT/US2017/055274
§ 371 (c)(1),
(2) Date: Jun. 13, 2018

(87) PCT Pub. No.: WO2018/067783
PCT Pub. Date: Apr. 12, 2018

(65) Prior Publication Data
US 2019/0216102 A1    Jul. 18, 2019

Related U.S. Application Data

(63) Continuation of application No. 15/287,313, filed on Oct. 6, 2016, now abandoned.

(51) Int. Cl.
*A21D 10/00*    (2006.01)
*A23P 30/20*    (2016.01)
(Continued)

(52) U.S. Cl.
CPC ............. *A21D 10/005* (2013.01); *A21D 2/02* (2013.01); *A21D 2/181* (2013.01); *A21D 2/36* (2013.01);
(Continued)

(58) Field of Classification Search
CPC ........ A21D 10/005; A21D 2/02; A21D 2/181; A21D 2/36; A21D 13/04; A23P 20/10; A23P 30/20; A23L 7/191; A23L 7/122
See application file for complete search history.

(56) References Cited

U.S. PATENT DOCUMENTS 3,976,793 A    8/1976    Olson et al.
4,542,033 A    9/1985    Agarwala
(Continued)

FOREIGN PATENT DOCUMENTS

CA    1044945        12/1978
EP    0908106 A1     4/1999
(Continued)

*Primary Examiner* — Katherine D Leblanc
(74) *Attorney, Agent, or Firm* — Diederiks & Whitelaw, PLC; Gregory P. Kaihoi, Esq.

(57) ABSTRACT

A coated food product is produced by combining a plurality of dry ingredients to form a dry mix and combining the dry mix with water to form a dough. A plurality of base pieces is formed from the dough. A slurry is prepared by combining at least sucrose, fruit purée and calcium carbonate. The slurry is combined with the plurality of base pieces to coat the plurality of base pieces and form a plurality of coated base pieces. After preparing the slurry and before combining the slurry with the plurality of base pieces, the slurry is stored or held for at least 30 minutes.

8 Claims, 1 Drawing Sheet

(51) Int. Cl.
    *A23L 7/122* (2016.01)
    *A23L 7/191* (2016.01)
    *A23P 20/10* (2016.01)
    *A21D 2/02* (2006.01)
    *A21D 2/18* (2006.01)
    *A21D 2/36* (2006.01)
    *A21D 13/04* (2017.01)

(52) U.S. Cl.
    CPC .............. *A21D 13/04* (2013.01); *A23L 7/122* (2016.08); *A23L 7/191* (2016.08); *A23P 20/10* (2016.08); *A23P 30/20* (2016.08)

(56) References Cited

U.S. PATENT DOCUMENTS

| | | |
|---|---|---|
| 4,645,674 A | 2/1987 | Lang et al. |
| 4,880,645 A | 11/1989 | Carpenter et al. |
| 4,927,657 A | 5/1990 | Antaki et al. |
| 4,965,076 A | 10/1990 | Martin et al. |
| 5,223,287 A | 6/1993 | Kearns et al. |
| 5,709,902 A | 1/1998 | Bartolomei et al. |
| 5,718,931 A | 2/1998 | Walter et al. |
| 5,840,356 A | 11/1998 | Swensen |
| 6,033,696 A | 3/2000 | Aebischer et al. |
| 6,174,553 B1 | 1/2001 | Cerda et al. |
| 6,500,480 B1 | 12/2002 | Burri et al. |
| 7,867,537 B2 | 1/2011 | Karwowski et al. |
| 8,071,145 B2 | 12/2011 | Dewille et al. |
| 8,119,178 B2 | 2/2012 | Lidster et al. |
| 8,883,238 B2 | 11/2014 | Siddoway et al. |
| 2002/0025360 A1 | 2/2002 | Yang et al. |
| 2008/0317919 A1 | 12/2008 | Long et al. |
| 2010/0173051 A1 | 7/2010 | Froseth et al. |
| 2013/0071523 A1 | 3/2013 | Barrett et al. |
| 2014/0272013 A1 | 9/2014 | Zhao et al. |
| 2015/0289555 A1 | 10/2015 | Barrett et al. |

FOREIGN PATENT DOCUMENTS

| | | |
|---|---|---|
| GB | 493248 | 1/1939 |
| WO | WO 2001/060177 | 8/2001 |
| WO | WO 20140153210 | 9/2014 |

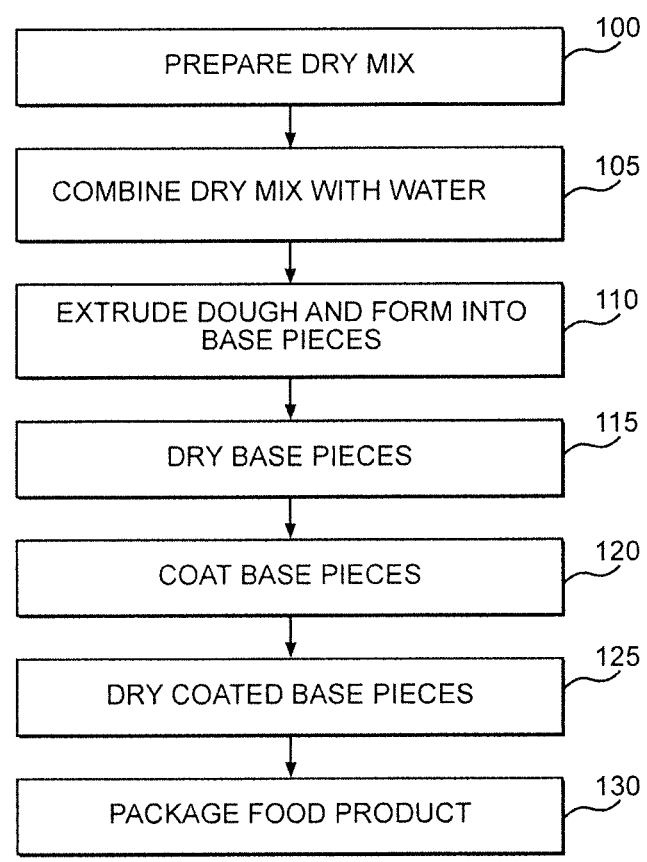

COATED FOOD PRODUCT AND METHOD OF PRODUCING THE COATED FOOD PRODUCT

CROSS-REFERENCE TO RELATED APPLICATIONS

[000.5] This application represents a National stage application of PCT/US2017/055274, filed Oct. 5, 2017, entitled "Coated Food Product and Method of Producing the Coated Food Product" which claims priority to U.S. patent application Ser. No. 15/287,313, filed Oct. 6, 2018, abandoned. The entire content of these applications are incorporated by reference.

BACKGROUND OF THE INVENTION

The present invention pertains to slurries for use in the production of food products and, more particularly, to slowing the rate of sucrose hydrolysis in a slurry.

When producing, packaging and selling food products on a large scale, certain issues can arise that might not be present when the food products are created on a smaller scale. For example, some of the ingredients may be prepared ahead of time. In such a case, it is important that the properties of the ingredients not change significantly between preparation and use. In the case of a slurry containing sucrose, hydrolysis (or inversion) of the sucrose occurs over time. Specifically, sucrose hydrolysis refers to the process by which sucrose is broken down into glucose and fructose. This has the effect of gradually increasing the stickiness of the slurry. Typically, the hydrolysis of sucrose is slow enough as not to be problematic over the timeframes involved in food production. However, hydrolysis does occur more quickly in certain circumstances. The increased stickiness caused by sucrose hydrolysis can lead to clumping or cause other production issues such as clogging of the pipes or machinery through which the slurry passes. If the slurry is used as a coating, clumping of the slurry can result in a product having an undesirable appearance or inconsistent flavor. Clogging of the pipes or machinery can lead to the shutdown of production lines, thereby increasing costs and potentially reducing the amount of product that can be produced.

In view of the above, there is a need in the art for a way to reduce the rate of sucrose hydrolysis in a slurry that is stored or otherwise held prior to use.

SUMMARY OF THE INVENTION

The present invention is directed to a coated food product produced by combining a plurality of dry ingredients to form a dry mix and combining the dry mix with water to form a dough. A plurality of base pieces is formed from the dough. A slurry is prepared by combining at least sucrose, fruit purée and calcium carbonate. The slurry is combined with the plurality of base pieces to coat the plurality of base pieces and form a plurality of coated base pieces. After preparing the slurry and before combining the slurry with the plurality of base pieces, the slurry is stored or held for at least 30 minutes. In one embodiment, after combining the sucrose, fruit purée and calcium carbonate, the slurry is transferred to an enrober.

In one embodiment, the slurry has a pH of approximately 6.0-7.0. The slurry includes approximately 1.0-1.5% calcium carbonate, approximately 8-20% fruit purée and approximately 70-80% sucrose. The fruit purée has a pH below approximately 4.0. In one embodiment, the dry mix includes approximately 0.1-2.0% calcium carbonate and greater than approximately 80% oat flour.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 1 shows a portion of a process for producing ready-to-eat cereal products in accordance with the present invention.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. Therefore, specific details disclosed herein are not to be interpreted as limiting, but merely as a representative basis for teaching one skilled in the art to employ the present invention. In addition, any specific numerical value listed herein includes a margin of error of +/−5%. Accordingly, a mass of 100 grams includes masses between 95 and 105 grams. Similarly, a range of 100-120 grams includes masses between 95 and 126 grams. The term "approximately" increases the margin of error to 10%. For numerical values expressed as percentages, the margin of error refers to the base numerical value. In other words, "approximately 20%" means 18-22% and not 10-30%. Furthermore, unless otherwise specified or inapplicable, the percentages given are by weight.

Although the techniques of the present invention can be used in connection with a variety of food products, they will primarily be described below with reference to coated ready-to-eat (RTE) or breakfast cereals. Specifically, the cereals are coated with a fruit-based slurry. However, it should become apparent that the present invention is not limited to such products.

A wide variety of food and snack products are prepared from cooked cereal doughs, including RTE or breakfast cereals. Generally, in the preparation of cooked cereal dough, cereal or farinaceous ingredients, such as various cereal flours, are first admixed with other dry ingredients, such as salt, minerals, starch and sugars, to form a dry blend of ingredients. This dry blend is then further blended with various liquid ingredients (including water), heated and worked to gelatinize or cook the starch fraction of the cereal ingredients and other starchy materials. A wide variety of blending, cooking and working apparatuses and techniques are known in the art. More recently, the preparation of cooked cereal dough using a cooker extruder, especially a twin-screw extruder, has become commonplace. The cooked cereal doughs so prepared can be processed to form finished products of various sizes, textures and shapes. Typically, a post-cooking cereal dough formation step involves forming suitably sized and shaped individual pieces, such as shreds, flakes, biscuits or puffs. Thereafter, the finished dried cereal base pieces can have a topical coating applied thereto in order to provide desired taste and texture attributes. For instance, in the preparation of a breakfast cereal, the topical coating can be a sugar or fruit coating.

Of particular interest to the present invention is the production of RTE cereals that are coated with fruit-based slurries. With initial reference to FIG. 1, a portion of a process for producing RTE cereals in accordance with the present invention is shown. At step 100, a dry mix of ingredients is prepared. At step 105, the dry mix is combined with water in a cooker extruder to form a cooked cereal dough. Of course, a variety of additional ingredients can be added to the cooker extruder depending on the desired end product. The process illustrated in FIG. 1 is intended to provide a more generic overview given that many different cereal production processes are known in the art. Next, at step 110, the cooked cereal dough is extruded and formed into pieces having a desired size and shape. At step 115, these cereal base pieces are dried. After drying, at step 120, the cereal base pieces are coated with one or more slurries to form coated cereal pieces. At step 125, the coated cereal pieces are dried. The resulting cereal product can then be packaged at step 130.

For the sake of completeness, it should be noted that the dry mix prepared in step 100 can take many forms known in the art, such as being formed with appropriately sized particles of whole grains supplied by any of the major cereal grains including wheat, corn (maize), oats, barley, rye, rice and mixtures thereof. In one form, the dry mix has only fine particles so as to constitute a cereal flour. The dry mix can also include various minor ingredients or additives such as sugar(s), salt and mineral salts (e.g., calcium carbonate, trisodium phosphate, tripotassium phosphate) and starches that can be conveniently pre-blended with the other portions of the dry mix. The dry mix can comprise approximately 40 to 99% (dry basis) of the cooked cereal dough formed in step 105. In terms of organoleptic attributes and reductions in RTE cereal piece frangibility, better results are obtained when the dry mix comprises approximately 75 to 99% of the cooked cereal dough.

The cereal base pieces formed in step 110 can be of any geometric configuration or form including, for example, flakes or puffs, shreds, biscuits, mini biscuits or the like. The present invention finds particular utility in connection with puffed cereal base pieces. Especially useful are smooth puffed pieces such as O- or ring-shaped pieces fabricated from oat-based cooked cereal doughs. Any conventional method of preparation can be used to provide these puffed cereal base pieces.

For those food products requiring low moisture contents, it is important that step 115 be performed, i.e., that a drying operation be performed prior to coating of the cereal base pieces. Typically, for example, puffed cereal base pieces must be dried to relatively low moisture contents in order to have the desired crispness or frangibility. Thus, when a puffed cereal is used in connection with the present invention, it is preferable to dry the puffed cereal base pieces to a moisture content of less than approximately 8%, and preferably less than approximately 6%, prior to the application of the coating in step 120. Any conventional drying technique can be used to reduce the moisture content of the cereal base pieces. The drying can be accomplished using equipment such as a rotary bed, tray or belt dryers. Simple hot air convection drying (at 200° F. to 280° F., for example) is the preferred technique for drying the cereal base pieces. Of course, in certain applications (e.g., when the puffed cereal base pieces are provided by direct expansion from a cooker extruder), the moisture content may be of suitable range without the need for a separate drying step. In other words, step 115 need not always be performed.

During the coating of step 120, the weight ratio of the cereal base pieces to the one or more slurries (i.e., the coating) preferably ranges from approximately 55:45 to approximately 80:20 and more preferably from approximately 65:35 to approximately 70:30. The coating can be applied to the cereal base pieces using an enrober (e.g., an enrober drum) while the coating is at an elevated temperature and thus fluid. The coating can be at a temperature between 200 and 300° F., preferably between 212 and 300° F., and more preferably between 220 and 270° F. The coating should preferably be introduced as a fine spray. Any conventional enrobing apparatus and technique can be used in step 120. Generally, one useful technique involves tumbling. The cereal base pieces and coating are added to a rotating drum and tumbled for a sufficient time to achieve an even distribution of the coating on the cereal base pieces. Preferably, the coating is added to the drum after the cereal base pieces. Another useful technique involves spraying the coating over the cereal base pieces in situations where the cereal base pieces are desirably not tumbled due to their shape, frangibility, etc.

The coated cereal pieces preferably have a moisture content in the range of approximately 1-5% to provide for shelf stable storage. Conventionally, this is accomplished by subjecting the coated cereal pieces to a drying step. In the present invention, this drying step is represented by step 125, during which the coated cereal pieces are placed in a dryer for a time sufficient to reduce their moisture content to the desired level. Specifically, step 125 serves to remove the moisture added with the one or more slurries (i.e., the coating) of step 120. In certain embodiments, however, the coating can be at a sufficiently low moisture content that post-coating drying is minimal or even unnecessary.

The resulting cereal product is characterized by a thin coating that is typically approximately 20 to 40 microns in thickness. If desired, the cereal product can further be fortified with an exterior or topical application of heat-sensitive vitamins. In such a case, a dispersion of one or more vitamins is topically added to the cereal product such as by tumbling to form a vitamin-fortified cereal product. No further drying is required since only a small amount of moisture is added by the topical vitamin application. After the drying of step 125 and the optional vitamin fortification, the cereal product is allowed to cool to ambient temperature and then packaged in a conventional manner in step 130.

For cereals produced by the process described in connection with FIG. 1, the relevant slurries, for purposes of the present invention, are those applied to the cereal base pieces as a coating in step 120. In one embodiment, one of these slurries is made using strawberries, although a variety of different fruits can be used. For example, the slurry can be made using berries, stone fruits, citrus fruits, orchard fruits, tropical fruits or combinations thereof. Since the slurry is natural fruit-based, it may include sucrose from the fruit itself. In addition, sucrose is added to the slurry in the form of table or granulated sugar. As noted above, when a slurry containing sucrose is stored or otherwise held prior to use, hydrolysis of the sucrose occurs over time. This has the effect of gradually increasing the stickiness of the slurry, which can lead to significant production issues. Typically, the hydrolysis of sucrose in certain sweetener slurries is slow enough as not to be problematic over the timeframes involved in cereal production. However, hydrolysis does occur more quickly in the fruit-based slurries of interest. Accordingly, the invention particularly addresses this issue.

One potential cause of more rapid sucrose hydrolysis is the presence of invertase. Regardless of this concern, a core issue was eventually found, showing that the hydrolysis of sucrose also proceeds more rapidly at low pH values. Fruit-based slurries are extremely hydroscopic and typically have lower pH values than non-fruit-based slurries due to the inclusion of acidic fruit purées. For example, one strawberry purée usable in connection with the present invention has a pH between 3.55 and 3.60. More generally, fruit purées usable in connection with the present invention typically have pH values below approximately 4.0, but certainly below 5.0. As a result, sucrose hydrolysis proceeds more rapidly in fruit-based slurries than in non-fruit-based slurries. To address this issue, a base ingredient is included in the fruit-based slurries of the present invention to increase their pH values. Preferably, use of the base ingredient results in a slurry having a pH value of approximately 6.0-7.0. Without use of the base ingredient, one fruit-based slurry studied had a pH value of approximately 4.0-4.1. Although other base ingredients could conceivably be used, employing calcium carbonate, which is not very soluble and has a pH value of 9.9 was found, to be significantly more effective in neutralizing the acid and keeping sugar inversion under control. In addition to increasing the pH of a slurry, neutralizing the acid and keeping sugar inversion under control, calcium carbonate advantageously serves as a calcium supplement. Furthermore, since calcium carbonate is already present in the cereal base pieces of certain cereals for this purpose, the overall calcium level of such a cereal can be maintained by decreasing the amount of calcium carbonate in the cereal base pieces when calcium carbonate is used in the coating.

In one exemplary embodiment, an RTE cereal is produced using a dry mix including, among other ingredients, oat flour, oat bran, corn starch and calcium carbonate. Preferably, the amount of calcium carbonate included in the dry mix is approximately 0.1-2.0%, and the amount of oat flour included in the dry mix is greater than approximately 80%. More preferably, the amount of calcium carbonate included in the dry mix is approximately 0.9%. This dry mix is combined with water, cooked, extruded, formed into puffed cereal base pieces, dried and transferred to an enrober drum (or other equivalent apparatus). Three separate slurries are then added to the enrober drum to coat the puffed cereal base pieces. The first slurry is a fruit-based slurry, the second slurry is a vitamin slurry and the third slurry is simply fruit flavoring. The fruit-based slurry includes, among other ingredients, granulated sugar (i.e., sucrose), fruit purée (e.g., strawberry purée), water, canola oil and calcium carbonate. Preferably, the fruit-based slurry is approximately 70-80% granulated sugar, approximately 8-20% fruit purée and approximately 0.5-2.0% calcium carbonate. More preferably, the fruit-based slurry is approximately 75.0% granulated sugar, approximately 12.0 or 16.0% fruit purée and approximately 1.0-1.5% calcium carbonate (e.g., 1.0, 1.25 or 1.5% calcium carbonate). As such, calcium carbonate is added to the RTE cereal at two different points. These additions, in combination, result in a desired amount of calcium being included in the cereal, although additional calcium carbonate (even up to 3% of the slurry) could be added for further calcium fortification. Also, as discussed above, the calcium carbonate included in the fruit-based slurry effectively raises the pH of that slurry, thereby beneficially reducing the rate of sucrose hydrolysis. Turning to the vitamin slurry, the vitamin slurry includes, among other ingredients, water and vitamins. Although heat-sensitive vitamins should be added later, as noted above, non-heat-sensitive vitamins can be included in this slurry. With respect to the third slurry, the third slurry includes only fruit flavoring. This fruit flavoring can match the fruit purée or complement it. For example, strawberry flavoring can be used with strawberry purée. After the three slurries have been used to coat the puffed cereal base pieces, the coated cereal base pieces are dried, left to cool and then packaged.

Since the hydrolysis of sucrose takes time even at low pH values, the inclusion of calcium carbonate (or another basic ingredient) in a fruit-based slurry prepared in accordance with the present invention is most useful when the slurry is stored or otherwise held prior to use. In other words, if the slurry is used immediately (i.e., within 5 or 10 minutes), calcium carbonate may not be needed to maintain the stickiness of the slurry at an acceptable level. However, during large-scale production, it is often beneficial to be able to store or hold intermediate products, such as the fruit-based slurries, for extended periods of time. For example, the fruit-based slurries of the present invention are typically stored or held for 30, 60, 90, 120 or more minutes between preparation and use (e.g., the point at which the slurry is combined with cereal base pieces). The calcium carbonate prevents the slurries from becoming excessively sticky during such timeframes. For purposes of the present invention, by a slurry being stored, it is meant that the slurry is kept in one or more vessels (e.g., containers or machinery) that are distinct from: 1) the one or more vessels used to prepare the slurry; and 2) the one or more vessels used to mix the slurry with the base pieces. By a slurry being held, it is meant that the slurry is kept in 1) the one or more vessels used to prepare the slurry; or 2) the one or more vessels used to mix the slurry with the base pieces.

Based on the above, it should be readily apparent that the present invention provides a way to reduce the rate of sucrose hydrolysis in a slurry that is stored or otherwise held prior to use. Although described with reference to preferred embodiments, it should be readily understood that various changes or modifications could be made to the invention without departing from the spirit thereof. For example, while the above discussion is focused on fruit-based slurries for RTE cereals, the techniques of the present invention are applicable to other acidic slurries containing sucrose, as well as to other food products. In general, the invention is only intended to be limited by the scope of the following claims.

The invention claimed is:

1. A method of producing a coated food product, the method comprising:
   combining a plurality of dry ingredients to form a dry mix;
   combining the dry mix with water to form a dough;
   forming a plurality of base pieces from the dough;
   preparing a slurry by combining at least sucrose, fruit pure and an amount of calcium carbonate sufficient for the slurry to have a pH of approximately 6.0-7.0, wherein the fruit pure has a pH below approximately 4.0;
   combining the slurry with the plurality of base pieces to coat the plurality of base pieces and form a plurality of coated base pieces, wherein the slurry has a pH of approximately 6.0-7.0 when combined with the plurality of base pieces; and
   after preparing the slurry and before combining the slurry with the plurality of base pieces, storing or holding the slurry for at least 30 minutes.

2. The method of claim 1, further comprising, after combining the sucrose, fruit purée and calcium carbonate, transferring the slurry to an enrober.

3. The method of claim 1, wherein the slurry has a pH of 6.0-7.0 when combined with the plurality of base pieces.

4. The method of claim 1, wherein the slurry includes approximately 1.0-1.5% calcium carbonate.

5. The method of claim 4, wherein the dry mix includes approximately 0.1-2.0% calcium carbonate.

6. The method of claim 1, wherein the slurry includes approximately 8-20% fruit purée.

7. The method of claim 6, wherein the slurry includes approximately 70-80% sucrose.

8. The method of claim 7, wherein the dry mix includes greater than approximately 80% oat flour.

* * * * *